Nov. 6, 1956
F. K. HUTCHINSON
2,769,617
ELECTRIC LIVESTOCK GATE
Filed Oct. 18, 1955
2 Sheets-Sheet 1
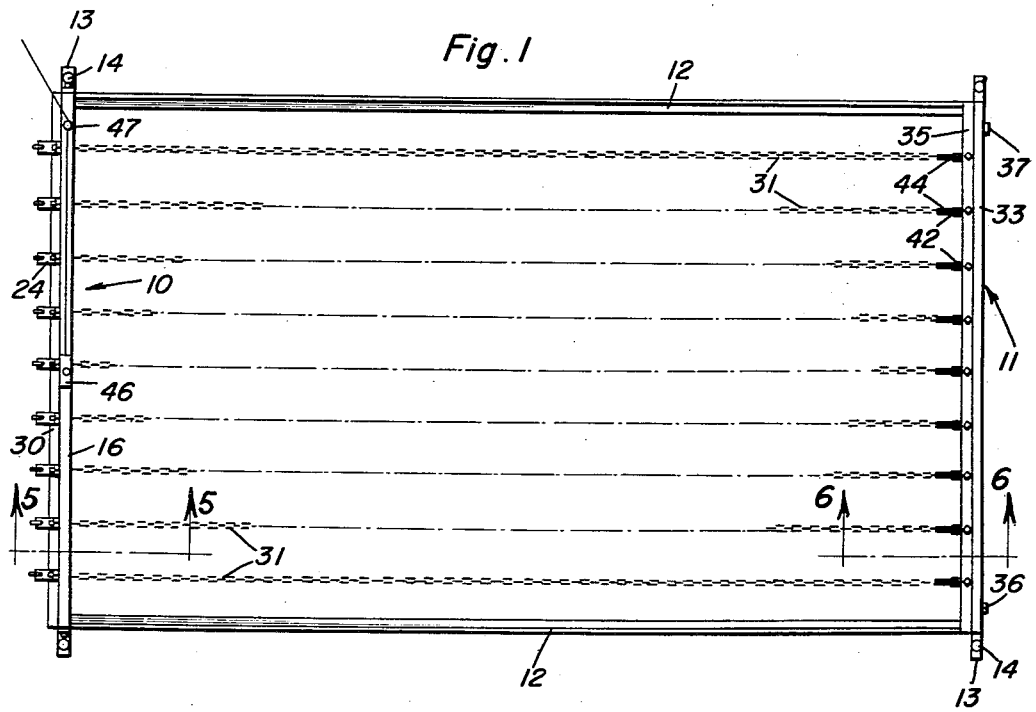
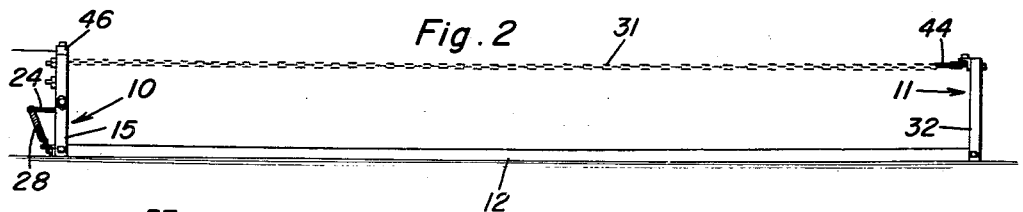
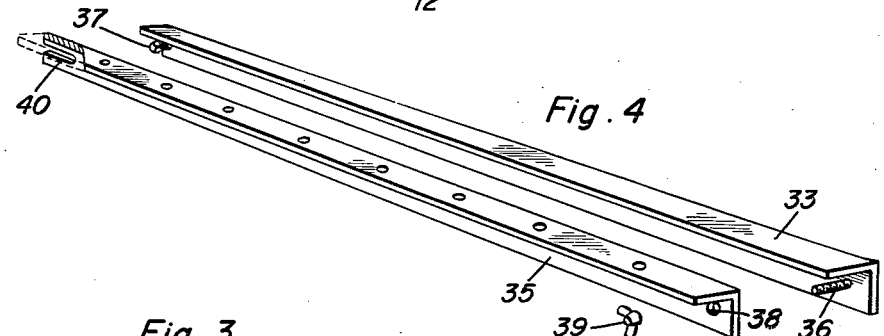
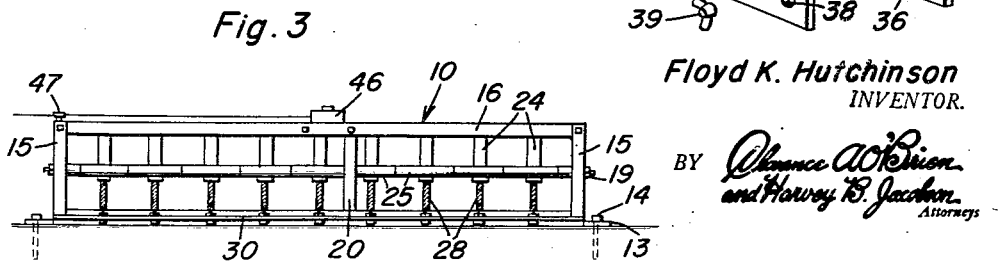
Floyd K. Hutchinson
INVENTOR.

Nov. 6, 1956  F. K. HUTCHINSON  2,769,617
ELECTRIC LIVESTOCK GATE
Filed Oct. 18, 1955  2 Sheets-Sheet 2

Floyd K. Hutchinson
INVENTOR.

BY *Lawrence A. O'Brien*
*and Harvey B. Jackson*
Attorneys

United States Patent Office 2,769,617
Patented Nov. 6, 1956

2,769,617

ELECTRIC LIVESTOCK GATE

Floyd K. Hutchinson, Somonauk, Ill.

Application October 18, 1955, Serial No. 541,239

2 Claims. (Cl. 256—10)

The present invention relates to new and useful improvements in electric livestock gates for use particularly with movable electric fences and has for its primary object to provide, in a manner as hereinafter set forth, a device of this character which is portable whereby it may be readily moved from place to place.

Another very important object of the invention is to provide a portable electric gate of the aforementioned character which will permit at all times the passage of automobiles and other vehicles, farm implements, etc., without being damaged thereby and, further, without shocking the operator.

Still another important object of the invention is to provide an electric gate of the character described which, when desired, may be rendered inoperative to allow the passage of livestock.

Other objects of the invention are to provide a portable electric livestock gate which will be comparatively simple in construction, strong, durable, of light weight and which may be manufactured at low cost.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a top plan view of a portable electric livestock gate constructed in accordance with the present invention;

Figure 2 is a view in side elevation of the device;

Figure 3 is an end elevational view;

Figure 4 is a perspective view on an enlarged scale of the conductor chain supporting bars on one end of the device, showing said bars separated;

Figure 5:
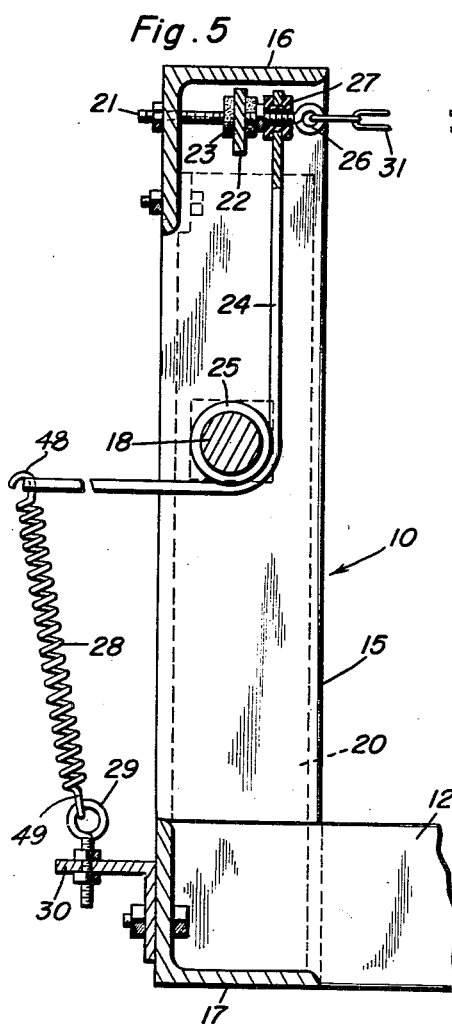
Figure 5 is a vertical sectional view on an enlarged scale through one end portion of the device, taken substantially on the line 5—5 of Figure 1.
Figure 6:
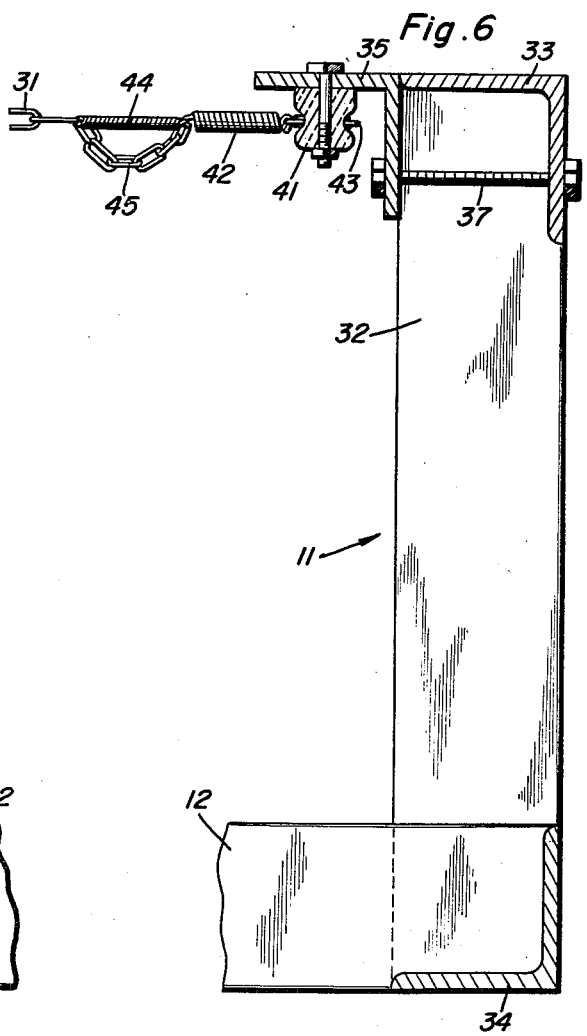
Figure 6 is a vertical sectional view on an enlarged scale through the other end portion of the device, taken substantially on the line 6—6 of Figure 1.
Figure 7:
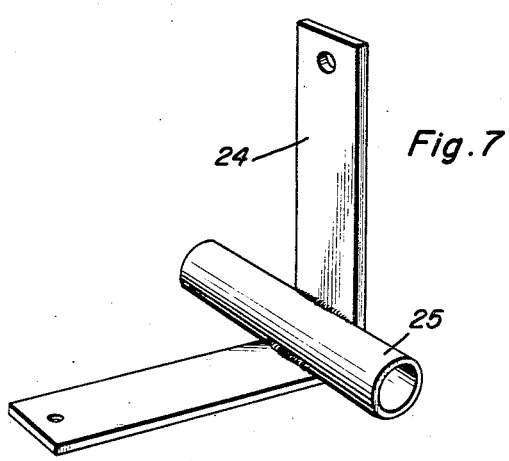
Figure 7 is an enlarged detail view in perspective of one of the rockable contact arms.

Referring now to the drawing in detail, it will be seen that the embodiment of the invention which has been illustrated comprises a pair of upstanding metallic end frames which are designated generally by reference characters 10 and 11. The frames 10 and 11 are rigidly secured on the end portions of a pair of angle iron side bars 12. The frames 10 and 11 are provided on the lower portions thereof with feet 13 having openings therein accommodating anchoring stakes 14.

The frame 10 includes uprights 15 and upper and lower cross members 16 and 17, respectively, of angle iron extending therebetween. Also extending between the uprights 15, at an intermediate point, is a horizontal shaft or rod 18. Retaining nuts 19 are threaded on the end portions of the shaft 18. At an intermediate point, the shaft 18 is supported by a brace 20 extending between the members 16 and 17.

Mounted on bolts 21 beneath the upper member 16 of the frame 10 is a conductor bar 22. Bushings 23 insulate the bar 22 from the bolts 21. Rockably mounted on the shaft 18 is a plurality of spaced bellcrank levers or angular arms 24 of suitable metal. The bellcrank levers 24 have fixed in the angles or bends thereof transverse bearing sleeves 25 which are journaled on the shaft 18 in end abutting engagement with each other. Contacts 26 in the form of eye bolts are mounted in the upper end portions of the levers 24 and electrically insulated therefrom by bushings 27, said contacts 26 being engageable with the conductor bar 22. Coil springs 28 have one end 48 connected to the lower end portions of the levers 24. The other ends 49 of the coil springs 28 are adjustably connected by eye bolts 29 to an angle bar 30 which is mounted on the lower cross member 17 of the frame 10. Flexible conductors in the form of chains 31 have one end connected to the contacts 26.

The frame 11 comprises uprights 32 with upper and lower cross members 33 and 34, respectively, of angle iron extending therebetween. Removably mounted on the upper portion of the frame 11 is an anchoring bar 35 of angle iron for the conductor chains 31. Bolts 36 and 37 on the cross member 33 detachably secure the bar 35 in position on the upper portion of the frame 11. As illustrated to advantage in Figure 4 of the drawing, the bolt 36 is engageable in an opening 38 provided therefor in one end portion of the bar 35 and said bolt has threaded thereon a wing nut 39. The bolt 37 is headed and is received in a longitudinal slot 40 which is provided therefor in the adjacent end portion of the bar 35.

Mounted beneath the removable bar 35 is a plurality of insulators 41, one for each of the conductor chains 31. The adjacent ends of the conductor chains 31 are connected to the insulators 41 by means comprising coil springs 42. Chains 43 connect the coil springs 42 to the insulators 41. The springs 42 have substantially the same tension or strength as the adjustable springs 28. The end portions of the conductor chains 31 which are adjacent the frame 11 have interposed therein relatively weak or light coil springs 44 for keeping said conductor chains taut at all times, the slack taken from said chains being indicated at 45.

In Figures 1, 2 and 3 of the drawing, reference character 46 designates a suitable control switch which is mounted on the end frame 10. The switch 46 may be electrically connected in any desired manner, as indicated at 47, to the conductor bar 22.

It is thought that the operation of the device will be readily apparent from a consideration of the foregoing. Briefly, the portable unit is anchored by the stakes 14 in the gateway or passage through a temporary electric fence line. The device may be electrically connected to the usual battery operated fence charger or receive its current from any other suitable source of supply. An animal attempting to traverse the gate, with the switch 46 closed, steps on or between the conductor chains 31 and closes an electric circuit in an obvious manner and is thus caused to desist and retreat. If the chains 31 are stepped on by the animal, said chains are first flexed downwardly against the tension of the relatively weak coil springs 44 and the slack 45 is taken up. Further downward pressure on the conductor chains 31 actuates the arms or levers 24 against the tension of the springs 28 and 42 thereby disengaging the contacts 26 from the conductor bar 22. The construction and arrangement is such that automobiles and other vehicles may safely pass over the gate without damaging any of the parts thereof. When it is desired to permit the passage of livestock, the bar 35 is removed from the end frame 11 and, with the conductor chains 31 still connected thereto, swung to an out-of-the-way position. By burying the angle iron side bars 12 below the surface of the ground and with the conductor chains 31 out of the way, the gate also permits the passage of equipment on skids.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. An electric livestock gate of the character described comprising: a pair of spaced, opposed, upstanding end frames, means connecting said end frames, a plurality of spaced, parallel flexible conductor members having one end anchored to one of the frames and insulated therefrom, a conductor bar mounted on the other frame, and means for detachably electrically connecting the conductor members to said conductor bar, the last-named means including levers pivotally mounted at an intermediate point on said other frame, contacts on one end portion of said levers connected to the conductor members and engageable with the bar, and coil springs connected to the other end portions of said levers for yieldingly urging same in a direction to engage the contacts with the bar.

2. An electric livestock gate of the character described comprising: a pair of spaced, opposed, upstanding frames, a plurality of spaced, flexible conductor members having one end anchored to one of the frames and electrically insulated therefrom, a conductor bar on the other frame, a shaft on said other frame paralleling said conductor bar, a plurality of bellcrank levers journaled on said shaft, contacts on one end portion of the bellcrank levers connected to the conductor members and engageable with the bar, and coil springs connected to the other end portions of said levers for yieldingly engaging the contacts with the bar.

References Cited in the file of this patent
UNITED STATES PATENTS
2,633,337    Nieuwenhuis           Mar. 31, 1953